United States Patent Office 3,036,677
Patented May 29, 1962

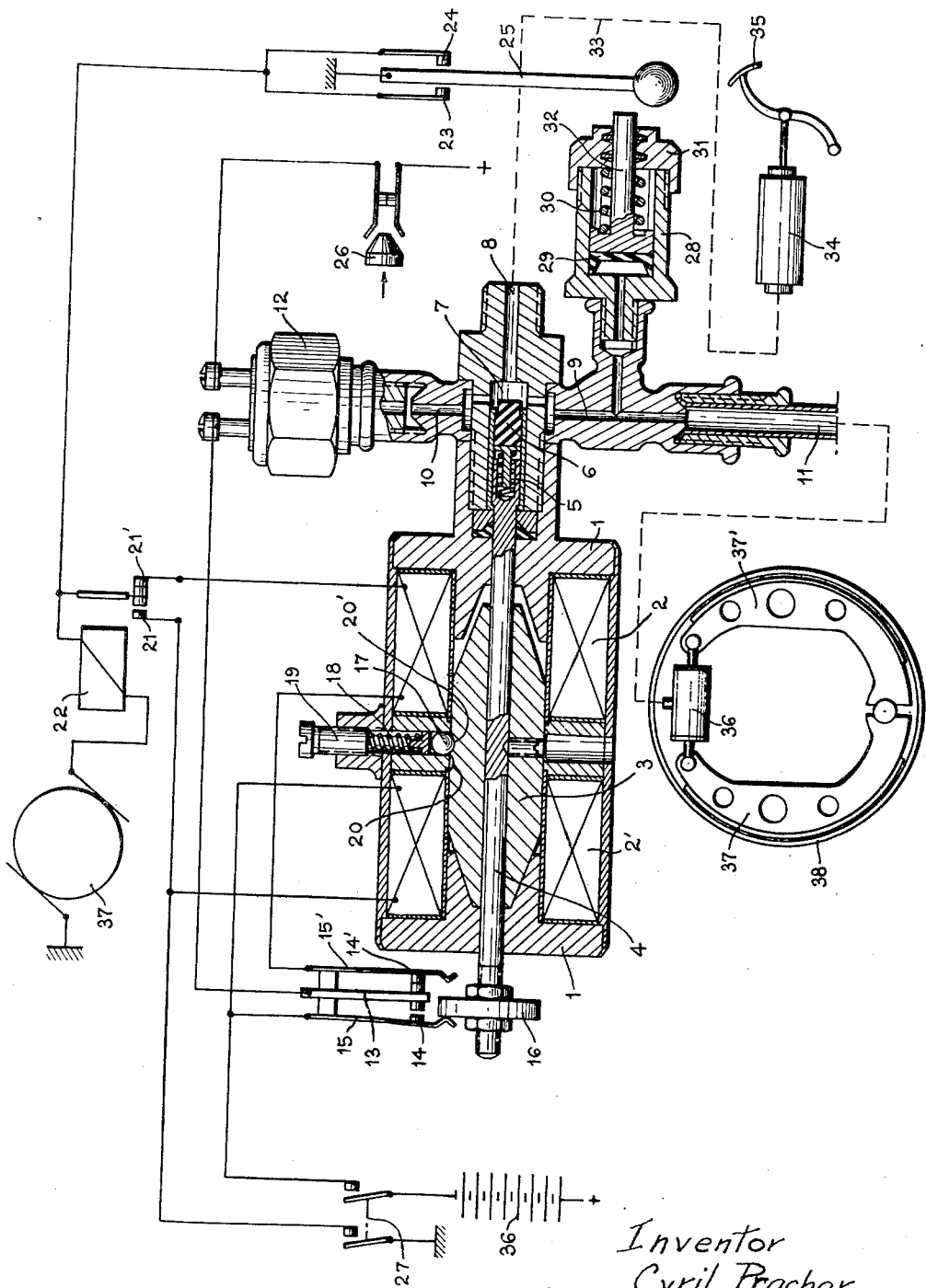

3,036,677
AUTOMATIC DEVICE FOR THE LOCKING AND UNLOCKING OF A MECHANICAL OR HYDRAULIC TRANSMISSION IN MOTOR VEHICLES
Cyril Prachar, 42 Rue Laugier, Paris, France
Filed Oct. 22, 1959, Ser. No. 847,944
Claims priority, application France Dec. 5, 1958
6 Claims. (Cl. 192—4)

The present invention relates to an automatic device for the locking at stop and the unlocking of a transmission or a part of the transmission in motor vehicles, in particular the gear box, the rear axle or the circuit of hydraulic brakes. Such devices are already known, particularly to lock at stop the hydraulic brakes and include in the hydraulic circuit a check valve, the opening and closing of which are produced by an electro-magnet, with the acceleration controlling the feeding of this electro-magnet. The drawback with such devices is that generally, to keep up the locking, the current is to pass through the electro-magnet; this can bring about a too fast discharge of the storage battery of the vehicle and give rise to a risk of non-working when this battery is insufficiently charged. The device according to the invention aims at coping with this difficulty: it can be applied to the locking and unlocking of any mechanical or hydraulic transmission or part of transmission and is characterised in that the electromagnet includes two windings acting in opposite directions on a plunger which actuates said bolting organ and is provided with a non-return device, preferably provided with balls, which keeps it in the two positions corresponding to the opening and closing respectively of said organ, so as to require a flowing of the current in the windings only during the period of transition bringing about the locking and the unlocking and as to be kept in the two working positions without requiring the flow of the current in the windings.

By way of example, a form of embodiment of the device according to the invention is described hereafter and illustrated in axial section in the annexed drawing, as applied to the locking at rest of the hydraulic brakes of a motor car.

The device includes essentially an electro-magnet, the magnetic circuit of which consists in a stationary part 1 bearing two coils 2, 2', and a biconical plunger 3 which can be drawn to the left or to the right, according as either one of the coils is energized.

The plunger 3 is rigidly locked with a stem 4 which actuates through a spring 5 a valve 6 mounted in a bore 7: the bore 7 is coupled in 8 with the pump of the brake circuit and is connected in 9 and 10, respectively, through the piping 33 to the master cylinder 34 controlled by the brake pedal 35, with the piping 11 leading to the brake cylinders 36, 36', 36'', 36''' controlling the jaws 37—37$_1$, 37'—37'$_1$, 37''—37''$_1$, 37'''—37'''$_1$ of the wheel brakes 38, 38', 38'', 38''' and with an hydro-electric relay 12. This relay 12 controls the energizing of coils 2, 2' by the storage-battery 36 of the circuit of the coils 2, 2', and is closed up when oil under pressure is sent in the brakes. (This relay may, for instance, be the relay of the red lamps "Stop.") The circuit of the coils is, in addition, first controlled by a switch, the stationary central contact 13 of which is connected by the relay 12 with the positive terminal of the battery. The movable contacts 14, 14', 15', operated by an abutment 16 provided on the stem 4 of the plunger 3 so that the circuit of any one of the coils is cut off when said coil has caused the plunger to reach the end of its stroke, whereas, on the contrary, the circuit of the other coil is closed to be ready to control the moving of the plunger in opposite direction. The electro-magnet bears on its stationary part a locking device constituted by a ball 17, which is leaded by a spring 18, kept under tension by a regulating screw 19: at the end of the plunger's strokes, this ball engages recesses 20, 20' respectively in said plunger to keep it stationary until the delivery of a current in the other coil will bring about its release. A second control of the coils 2, 2', is done by the resting and operating contacts 21, 21', of a relay 22, the winding of which is energized by the dynamo 37 when the speed of the engine is greater than idling speed, said relay being itself controlled by the contacts 23, 24, actuated by the gear shift lever 25 when said lever is in the first speed position or in reverse motion position. A break switch provided with a push-button 26, placed on the wire of the battery allows the whole of the device to be put out of service while a switch 27 placed on the instruments panel or in any other suitable place which is normally open, allows the contacts of the relay 22 to be short circuited and the coil 2 to be directly energized by the battery, as it will be explained, the brakes to be unlocked without having to close the contact of the car (for instance if the car is to be moved in the garage without using the switch key).

The device operates as follows: when the speed of the vehicle is greater than idling speed, the relay 22 is not energized if the lever 25 is placed on a higher speed than first speed so that the device is unable to bring about a locking. If the lever is placed in first speed position or in reverse motion position, the relay 22 is energized and contact 21' is closed; so that the plunger being in the unlocked position, at the left as shown in the drawing, the circuit of the right coil 2 is prepared for action by the contact 13—14'. If at that moment, the brake pedal is operated, the oil under pressure running through the bore 7 pushes back the valve 6 and compresses the spring 5, to flow, on the one hand in the pipe 11 and on the other hand in the relay 12 which closes the circuit of the coil 2 by energizing contact 13, attracting the plunger 3 towards the right and bringing about the closing of the valve 6. If the brake pedal is released and the engine is allowed to idle by a release of the accelerator, the current is switched off by the relay 22 which comes back on the resting contact 21, the plunger 3 being kept by the ball 17 in its locking position. The valve 6 remains closed: the braking pipe 11 is isolated and holds the pressure and thereby keeps up the braking action, the value of which is in relation with the degree of deflection of the brake pedal previously effected.

At that moment, it becomes possible to switch off the engine without suppressing the locking of the brakes which is secured by the mechanical locking of the plunger 3.

On the other hand, it suffices to speed up the engine and to bring its speed above idling speed to unlock the brakes. The relay 22 is thus energized, its armature comes upon the contact 21 and closes the circuit of the unlocking coil 2', prepared by the contacts 13—14 of the switch. The coil 2' attracts the plunger 3 towards the left and opens the valve 6 so that the oil pressure in the pipe 11 decreases, and thereby releases the brakes.

To prevent, during the standstill of the vehicle, the cooling of the oil and its resulting contraction on the feed circuit 11 of the brakes from bringing about a decrease of pressure and thereby the unlocking of the brakes, an expansion and contraction compensator is mounted in the pipe 11 downstream of the bolting device 5—7. This compensator is constituted by a cylinder 28 in which a piston 29 can move, under action of the pressure changes in the circuit 11; the piston 29 is equipped with a spring 30 which can be adjusted by means of the threaded plug 31 which forms the bottom of the cylinder 28 and through which the rod 32 of the piston is tightly guided.

The present device for the automatic locking and unlocking of the brakes, allows, on the one hand, a very easy handling, particularly for the working of the vehicle and the starting on a gradient and, on the other hand, secures a total reliability when the vehicle comes at a standstill on a gradient, particularly if a wheel is to be changed, as this standstill does not depend on the working of the parking brake and does not require the wedging of the wheels.

It must be noted that, if the brakes have been locked after a rather weak braking, it is possible to increase this braking by pressing anew the pedal, for this pressure increase will move the valve 6 from its seat and allow a further flow of oil in this pipe 11: the increased pressure will be kept up in this pipe since the valve 6 is closed by the spring 5 as soon as the pedal is released.

What I claim is:

1. In an automatic device for maintaining in a set position the hydraulic brake system of a motor vehicle comprising a brake pedal, a master cylinder actuated by said pedal, brake cylinders to actuate the wheel brakes, a conduit connecting said brake cylinders to said master cylinder, a check valve arranged in said conduit between the master cylinder and the brake cylinders, electric control means for said check valve comprising an electromagnet provided with two cylindrical windings, an armature movable axially through said windings, a battery, means to connect said winding to said battery so as to act on the armature in opposite directions respectively, a rod carrying said armature and operatively connected to said check valve to close and open same responsive to the energization of the corresponding winding, a retaining device comprising recesses arranged on said armature and at least one spring loaded ball cooperating with said recesses to hold said armature in each of its end positions after the winding has been deenergized, a pressure responsive relay of which the hydraulic means is connected to the hydraulic circuit between the check valve and the master cylinder, and of which the electric contact means actuated by said hydraulic means is arranged in the circuit of said windings of the electro-magnet to allow the energization thereof when the brake pedal is depressed, a dynamo driven by the engine, a relay having its coil connected to said dynamo and having its contact of rest corresponding to the idling speed of the engine of the vehicle arranged in the circuit of the winding of the electro-magnet causing the closing of the check valve, and its working contact, adapted to be closed when the speed of the engine is higher than the idling speed, arranged in the circuit of the winding causing the opening of the check valve, and two contacts arranged in the circuits of the windings of the electromagnet respectively and actuated by the armature carrying rod to automatically cut the circuit of one winding of the electromagnet at the end of the corresponding stroke of the armature and to close the circuit of the other winding to prepare same for the next operation.

2. In an automatic device for maintaining in a set position the hydraulic brake system of a motor vehicle comprising a brake pedal, a master cylinder actuated by said pedal, brake cylinders to actuate the wheel brakes, a conduit connecting said brake cylinders to said master cylinder, a check valve arranged in said conduit between the master cylinder and the brake cylinders, electric control means for said check valve comprising an electromagnet provided with two cylindrical windings, an armature movable axially through said windings, a battery, means to connect said winding to said battery so as to act on the armature in opposite directions respectively, a rod carrying said armature and operatively connected to said check valve to close and open same responsive to the energization of the corresponding winding, a retaining device comprising recesses arranged on said armature and at least one spring loaded ball cooperating with said recesses to hold said armature in each of its end positions after the winding has been deenergized, a pressure responsive relay of which the hydraulic means is connected to the hydraulic circuit between the check valve and the master cylinder, and of which the electric contact means actuated by said hydraulic means is arranged in the circuit of said windings of the electro-magnet to allow the energization thereof when the brake pedal is depressed, a dynamo driven by the engine, a relay having its coil connected to said dynamo and having its contact of rest corresponding to the idling speed of the engine of the vehicle arranged in the circuit of the winding of the electro-magnet causing the closing of the check valve, and its working contact, adapted to be closed when the speed of the engine is higher than the idling speed, arranged in the circuit of the winding causing the opening of the check valve, and a switch comprising a central stationary contact connected to the battery through said pressure responsive relay, and two movable contacts formed by two resilient blades arranged either side of said stationary contact and connected to the two windings of the electromagnet respectively, an abutment arranged on the armature carrying rod between said movable contacts to open at the end of the stroke of the armature the contact controlling the winding which has caused said stroke and to close the contact of the other winding, whereby the operation of the stroke of opposite direction is prepared.

3. In an automatic device for maintaining in a set position the hydraulic brake system of a motor vehicle comprising a brake pedal, a master cylinder actuated by said pedal, brake cylinders to actuate the wheel brakes, a circuit connecting said brake cylinders to said master cylinder, a check valve arranged in said conduit between the master cylinder and the brake cylinders, electric control means for said check valve comprising an electro-magnet provided with two cylindrical windings, an armature movable axially through said windings, a battery, means to connect said winding to said battery so as to act on the armature in opposite directions respectively, a rod carrying said armature and operatively connected to said check valve to close and open same responsive to the energization of the corresponding winding, a retaining device comprising recesses arranged on said armature and at least one spring loaded ball cooperating with said recesses to hold said armature in each of its end positions after the winding has been deenergized, a pressure responsive relay of which the hydraulic means is connected to the hydraulic circuit between the check valve and the master cylinder, and of which the electric contact means actuated by said hydraulic means is arranged in the circuit of said windings of the electro-magnet to allow the energization thereof when the brake pedal is depressed, a dynamo driven by the engine, a relay having its coil connected to said dynamo and having its contact of rest corresponding to the idling speed of the engine of the vehicle arranged in the circuit of the winding of the electro-magnet causing the closing of the check valve, and its working contact, adapted to be closed when the speed of the engine is higher than the idling speed, arranged in the circuit of the winding causing the opening of the check valve, means to further control the electromagnet actuating the check valve by the gear shift lever of the vehicle and comprising two contacts adapted to be closed when said lever is placed on the first gear position and the reverse drive position respectively, said contacts being arranged in series with the coil of the relay energized by the dynamo driven by the engine, and two contacts arranged in the circuits of the windings of the electromagnet respectively and actuated by the armature carrying rod to automatically cut the circuit of one winding of the electromagnet at the end of the corresponding stroke of the armature and to close the circuit of the other winding to prepare same for the next operation.

4. In a device according to claim 3, a manually operated switch arranged to short circuit the contact of rest of the relay energized by the dynamo and to directly connect the battery with the winding of the electromagnet causing the opening of the check-valve and the unlocking of the brakes.

5. In a device according to claim 3, a manually operated switch arranged in series in the circuit connecting the battery to the windings of the electromagnet to put the locking device in and out of service.

6. In an automatic device for maintaining in a set position the hydraulic brake system of a motor vehicle comprising a brake pedal, a master cylinder actuated by said pedal, brake cylinders to actuate the wheel brakes, a conduit connecting said brake cylinders to said master cylinder, a check valve arranged in said conduit between the master cylinder and the brake cylinders, electric control means for said check valve comprising an electromagnet provided with two cylindrical windings, an armature movable axially through said windings, a battery, means to connect said winding to said battery so as to act on the armature in opposite directions respectively, a rod carrying said armature and operatively connected to said check valve to close and open same responsive to the energization of the corresponding winding, a retaining device comprising recesses arranged on said armature and at least one spring loaded ball cooperating with said recesses to hold said armature in each of its end positions after the winding has been deenergized, a pressure responsive relay of which the hydraulic means is connected to the hydraulic circuit between the check valve and the master cylinder, and of which the electric contact means actuated by said hydraulic means is arranged in the circuit of said windings of the electromagnet to allow the energization thereof when the brake pedal is depressed, a dynamo driven by the engine, a relay having its coil connected to said dynamo and having its contact of rest corresponding to the idling speed of the engine of the vehicle arranged in the circuit of the winding of the electromagnet causing the closing of the check valve, and its working contact, adapted to be closed when the speed of the engine is higher than the idling speed, arranged in the circuit of the winding causing the opening of the check valve, and two contacts arranged in the circuits of the windings of the electromagnet respectively and actuated by the armature carrying rod to automatically cut the circuit of one winding of the electromagnet at the end of the corresponding stroke of the armature and to close the circuit of the other winding to prepare same for the next operation, an oil expansion and contraction compensator constituted by a cylinder connected to the hydraulic circuit between the check-valve and the brake cylinders, a spring loaded piston movably arranged in said cylinder and means to adjust the compression of the spring.

References Cited in the file of this patent

UNITED STATES PATENTS

| | | |
|---|---|---|
| Re. 23,408 | Wiseley | Sept. 4, 1951 |
| 2,431,848 | Van Meter | Dec. 2, 1947 |
| 2,502,118 | Ashton et al. | Mar. 28, 1950 |
| 2,506,543 | Collins | May 2, 1950 |
| 2,572,962 | Weiss et al. | Oct. 30, 1951 |
| 2,658,592 | Polomski | Nov. 10, 1953 |